United States Patent
Kubota et al.

(10) Patent No.: US 6,527,879 B2
(45) Date of Patent: Mar. 4, 2003

(54) SELF-LUBRICATING PISTON RING MATERIAL FOR INTERNAL COMBUSTION ENGINE AND PISTON RING

(75) Inventors: Kunichika Kubota, Yasugi (JP); Takehiro Ohno, Yonago (JP); Yoshiki Masugata, Yonago (JP)

(73) Assignee: Hitachi Metals Ltd., Tokyo (JP)

( * ) Notice: Subject to any disclaimer, the term of this patent is extended or adjusted under 35 U.S.C. 154(b) by 0 days.

(21) Appl. No.: 09/884,072

(22) Filed: Jun. 20, 2001

(65) Prior Publication Data

US 2002/0005616 A1 Jan. 17, 2002

Related U.S. Application Data

(63) Continuation-in-part of application No. 09/603,614, filed on Jun. 26, 2000, now abandoned.

(30) Foreign Application Priority Data

Jun. 25, 1999 (JP) ............................................. 11-179537
Mar. 17, 2000 (JP) ........................................ 2000-076562

(51) Int. Cl.[7] .......................... C22C 38/20; C22C 38/18; C22C 38/34; C22C 38/38
(52) U.S. Cl. ........................... 148/333; 420/42; 420/104
(58) Field of Search ..................... 420/42, 104; 148/333

(56) References Cited

FOREIGN PATENT DOCUMENTS

| JP | 56-98453 | 8/1981 | |
| JP | 58-46542 | 10/1983 | ........... C22C/38/22 |
| JP | 4-21742 | 1/1992 | ........... C22C/38/00 |
| JP | 05-230-596 | 9/1993 | |
| JP | 5-230596 | 9/1993 | ........... C22C/38/00 |
| JP | 06-221-436 | 8/1994 | |
| JP | 6-221436 | 8/1994 | ............... F16J/9/26 |
| JP | 06-330-241 | 11/1994 | |
| JP | 6-330241 | 11/1994 | ........... C22C/38/00 |
| JP | 07-258-792 | 10/1995 | |
| JP | 7-258792 | 10/1995 | ........... C22C/38/00 |
| JP | 10-30726 | 2/1998 | ............... F16J/9/26 |
| JP | 10-030-726 | 2/1998 | |
| JP | 10-68049 | 3/1998 | ........... C22C/38/00 |
| JP | 10-068-049 | 3/1998 | |
| JP | 11-140-595 | 5/1999 | |
| JP | 11-140595 | 5/1999 | ........... C22C/38/00 |

*Primary Examiner*—Deborah Yee
(74) *Attorney, Agent, or Firm*—Sughrue Mion, PLLC

(57) ABSTRACT

There are disclosed a piston ring material and a piston ring both having such superior properties contradictory each other as the sliding property required in a piston ring and the mechanical properties of a steel wire material subjected to a manufacture process. The piston ring material or the piston ring consists essentially, by mass, of not less than 0.3% but less than 0.8% C, 0.1 to 3.0% Si, 0.1 to 3.0% Mn, 0.03 to 0.3% S, 0.3 to 6.0% Cr, preferably 3.0 to 6.0% or 0.3 to 1.0% Cr, 0 to 3.0% Cu, and the balance Fe, and the distribution state of sulfide inclusions with a maximum diameter/minimum size $\geqq 3$ observed on structure parallel to the outer peripheral surface of the formed piston ring is such that an intersecting angle made between straight lines passing the maximum size of two of the sulfide inclusions is not more than 30 degrees. Further, the area ratio of nonmetallic inclusions occupying the structure is 2.0% or less, or in addition to the above-described composition, at least one selected from the group consisting of 0.01% or less of Ca, 0.5% or less in total of one or more of V, Nb, Ti, and 1.5% or less of Al is contained.

19 Claims, 5 Drawing Sheets

SULFIDE DISTRIBUTION OF FORGING RATIO OF 1 AND STATE OF MEASURING DEGREE OF INTERSECTING ANGLE

SULFIDE DISTRIBUTION OF FORGING RATIO OF 500 AND STATE OF MEASURING DEGREE OF INTERSECTING ANGLE

SELF-LUBRICATING PISTON RING MATERIAL FOR INTERNAL COMBUSTION ENGINE AND PISTON RING

CROSS-REFERENCE TO RELATED APPLICATIONS

This application is a Continuation-In-Part Application of U.S. patent application Ser. No. 09/603,614 filed on Jun. 26, 2000 now abandoned.

BACKGROUND OF THE INVENTION i) Field of the Invention

The invention relates to a piston ring mounted on internal combustion engines such as a car engine.

ii) Description of Related Art

A piston ring for use in an internal combustion engine, particularly in a car engine has heretofore been formed of cast iron, but has been shifted to a so-called steel piston ring made by forming a steel wire into a ring shape. Specifically, the piston ring is generally manufactured by a process having the steps of performing hot working, such as forging and hot-rolling, of an ingot with a predetermined composition to obtain a wire stock, further performing drawing and the like to obtain a steel wire material corresponding to a small sectional shape of the piston ring, and performing hardness tempering and bending to form the ring shape with a determined curvature.

At present it is general to mount three rings on one piston, that is, a top ring, a second ring, and an oil ring from the side of a combustion chamber, but in recent tendency the top and oil rings located in portions exposed severe to severe condition are formed of a steel so that the function is enhanced. As the background thereof, in recent years, the results of researches of an electric car etc. intended to be used instead of an internal combustion engine have become remarkable, and efforts to obtain further improvement of the internal combustion engine have been also made.

Moreover, in recent years, researches are also performed regarding the phenomenon in the interior of an engine, and according to the researches of Saito, et al. ("Research on Wear of Diesel Engine under Severe Operation Condition" in Research Presentation Lecture Meeting 1999 by Kyushu Branch of the Japan Society of Mechanical Engineers (1999)), it has been pointed out that the second ring formed of cast iron is most worn among the three rings in the current situation. Further reasons for the shifting to the steel ring reside in such respects as the followability needs to be enhanced because of thinning design of a ring structure for enhancing engine environmental performance, and that the mechanical strength of the piston ring accordingly needs to be enhanced, as the background thereof. Furthermore, the technical transfer and expansion easiness regarding the manufacture steps of the piston ring also become the great reasons.

The steel piston ring is greatly superior to the cast iron ring in mechanical property and wear resistance, but is inferior in an anti-seizure property, and this is one of the reasons why the steel piston ring is not used particularly in the second ring. To cope with this problem, as disclosed in JP-A-10-30726, in the steel piston ring a surface treatment such as nitriding etc. is used which is performed on a steel piston ring surface in contact with a cylinder liner. However, the surface treatment is insufficient in the respects of the cost and the prevention of Al adhesion occurring on the contact surface with the piston.

Moreover, there is an attempt to solve the problem without any surface treatment, and JP-B-58-46542 and etc. propose adding of Cr not less than 10% as the composition of the steel piston ring to increase in the steel of the piston ring Cr-based carbides superior in performance/cost. The increasing of the carbide amount can bring about remarkable enhancement of wear resistance, however, the enhancing effect of the anti-seizure property is slight, and there occurs such a fear of manufacture trouble as deteriorated machinability.

SUMMARY OF THE INVENTION

An object of the present invention is to satisfy all of three respects unachieved by the above-described technique: (1) the anti-seizure property is enhanced all over the surface of the piston ring; (2) a piston ring is manufactured by a material having an enhanced machinability in addition to the enhanced anti-seizure property; and (3) even in the forming into a piston ring shape with a small section, the piston ring can maintain sufficient mechanical properties.

As a result of various studies for solving the above-described problems, the inventors have found that the anti-seizure property and workability are effectively enhanced by adding an adequate amount of S to a low alloy steel containing 0.3 to 0.8% C as the principal constituent and that remarkable effect can be obtained preferably by simultaneously adding S and Ca, and have achieved the present invention.

In conventional technique, S is organized and added to engine oil as an extreme-pressure additive to prevent seizure. On the other hand, the inventors have found that when sulfides such as MnS are made to exist in the steel, S forms in-situ a sulfide film on a newly generated surface occurring on a friction surface by frictional heating, and this effectively enhances the lubricating performance. According to this means, since lubricant substances are distributed in the material, no large amount of lubricating substances needs to be added when raising the lubricating performance in a necessary local place. Moreover, unlike the extreme-pressure additive, no effect disappears even in the case of oil exchange, and a semipermanent function can be expected.

Moreover, the increasing of Cr-based carbides in the steel, the raising of the surface hardness by nitriding, and the like in the conventional technique aim at increasing a difference in wear resistance from the liner material of cast iron under abrasive wear. These also raise the anti-seizure property, however, by promoting the wear of the liner side in the state of uneven contact to thereby increase the contact area thereof, these aim at preventing local, abnormal rise of a specific load from occurring. Namely, these relate to technique for improving the conformability of an initially mounted piston ring, and scarcely contribute to improve the wear resisting property required against durability-deteriorating wear such as adhesion wear.

Furthermore, the excessive enhancement of the wear resistance causes the situation of attacking the liner side, the progress thereof causing the increase of clearance etc., and the blow-by amount related with the exhaust gas amount is increased. Since the above-described effect of S enhances the anti-seizure property by lowering the friction coefficient without promoting the material wear, it brings about such a superior advantage as a state of a small clearance change is maintained even in the progress of the engine operation.

Specifically, according to the first aspect of the invention, there is provided an elongate piston ring material with self-lubrication adapted to be suitable for producing a piston ring for an internal combustion engine, the piston ring material comprising a steel consisting essentially, by mass, of not less than 0.3% but less than 0.8% carbon, 0.1 to 3.0% silicon, 0.1 to 3.0% manganese, 0.03 to 0.3% sulfur, 0.3 to 6.0% chromium, 0 to 3.0% copper, and the balance iron, the piston ring material including sulfide inclusions each having aspect ratio, that is, ratio of maximum size to minimum size, not less than 3 when observed in longitudinal structure of the material, the sulfide inclusions in the longitudinal structure being oriented so that an intersecting angle made between an imaginary, straight line passing the maximum size of any one of the sulfide inclusions and another imaginary, straight line passing the maximum size of another of the sulfide inclusions is not more than 30 degrees.

According to the second aspect of the invention, there is provided a piston ring material with self-lubrication adapted to be suitable for producing a piston ring for an internal combustion engine, the piston ring material comprising a steel consisting essentially, by mass, of not less than 0.3% but less than 0.8% carbon, 0.1 to 3.0% silicon, 0.1 to 3.0% manganese, 0.03 to 0.3% sulfur, 0.3 to 6.0% chromium, 0 to 3.0% copper, and the balance iron, the piston ring material including sulfide inclusions each having aspect ratio, that is, ratio of maximum size to minimum size, not less than 3 when observed in a structure present in a face parallel to an outer periphery of a piston ring formed of the piston ring material, the sulfide inclusions in the structure being provided with such a distribution state as an intersecting angle made between an imaginary, straight line passing the maximum size of any one of the sulfide inclusions and another imaginary, straight line passing the maximum size of another of the sulfide inclusions is not more than 30 degrees. Preferably, not more than 0.01% Ca is added, and Cr is in a range of 3.0 to 6.0%, or 0.3 to 1.0%. Incidentally, the outer periphery of the piston ring material means the outer peripheral surface of the piston ring formed of the material, that is, the surface of the steel wire material which is parallel to the longitudinal direction.

Further, in the piston ring material or in the piston ring, the area ratio of nonmetallic inclusions in the structure may be not more than 2.0%, and in addition to the above-described composition, the piston ring material or the piston ring may contain at least one not more than 0.5% in total selected from the group consisting of V, Nb, and Ti, and/or may contain not more than 1.5% Al.

DETAILED DESCRIPTION OF THE PREFERRED EMBODIMENTS

The invention is characterized in that a piston ring made of a low alloy steel containing 0.3 to 0.8% C as the principal constituent thereof is provided with the self-lubricating property brought about by sulfide inclusions existing in the steel, whereby the anti-seizure property is enhanced while minimizing the wear of parts. The invention will be described hereinafter in detail.

C (carbon) is an important element, a part of C being dissolved in a matrix to afford the strength of the low alloy steel, and another part of C forms carbides to enhance the wear resistance and anti-seizure property. For this reason, at least 0.3% C is necessary. However, C not less than 0.8% makes it difficult to work the material into a steel wire or to bend the material into a ring shape. Since it is important particularly in a piston ring to manufacture the piston ring inexpensively by enhancing the productivity thereof, the C content is set to be less than 0.8%.

Since Si is usually added as a deoxidizer, the lower limit is set to be 0.1%. On the other hand, Si influences the temper softening behavior of the steel, and the influence of Si is important particularly in the low alloy steel. The preferable Si content for minimizing the temper softening and the enhancing the heat resisting strength is 1.0% or more. However, since the excess addition thereof lowers the cold workability, the upper limit of Si is set to be 3.0%.

Although Mn is used as a deoxidizer similarly to Si, and 0.1% is necessary at minimum, but the excessive addition deteriorates the hot workability. Therefore, the upper limit is set to be 3.0%.

A part of Cr is combined with C to form a carbide and the wear resistance and anti-seizure property are enhanced. Further, a part thereof is dissolved in the matrix and enhances the corrosion resistance and temper softening resistance. Furthermore, this component is necessary for keeping the sufficient hardenability to thereby obtain a sufficient heat treatment hardness. What is the most important is that the kinds of precipitated carbides must be controlled to achieve such the first object of the invention as to enhance the sliding property without any surface treatment.

Figure 1:
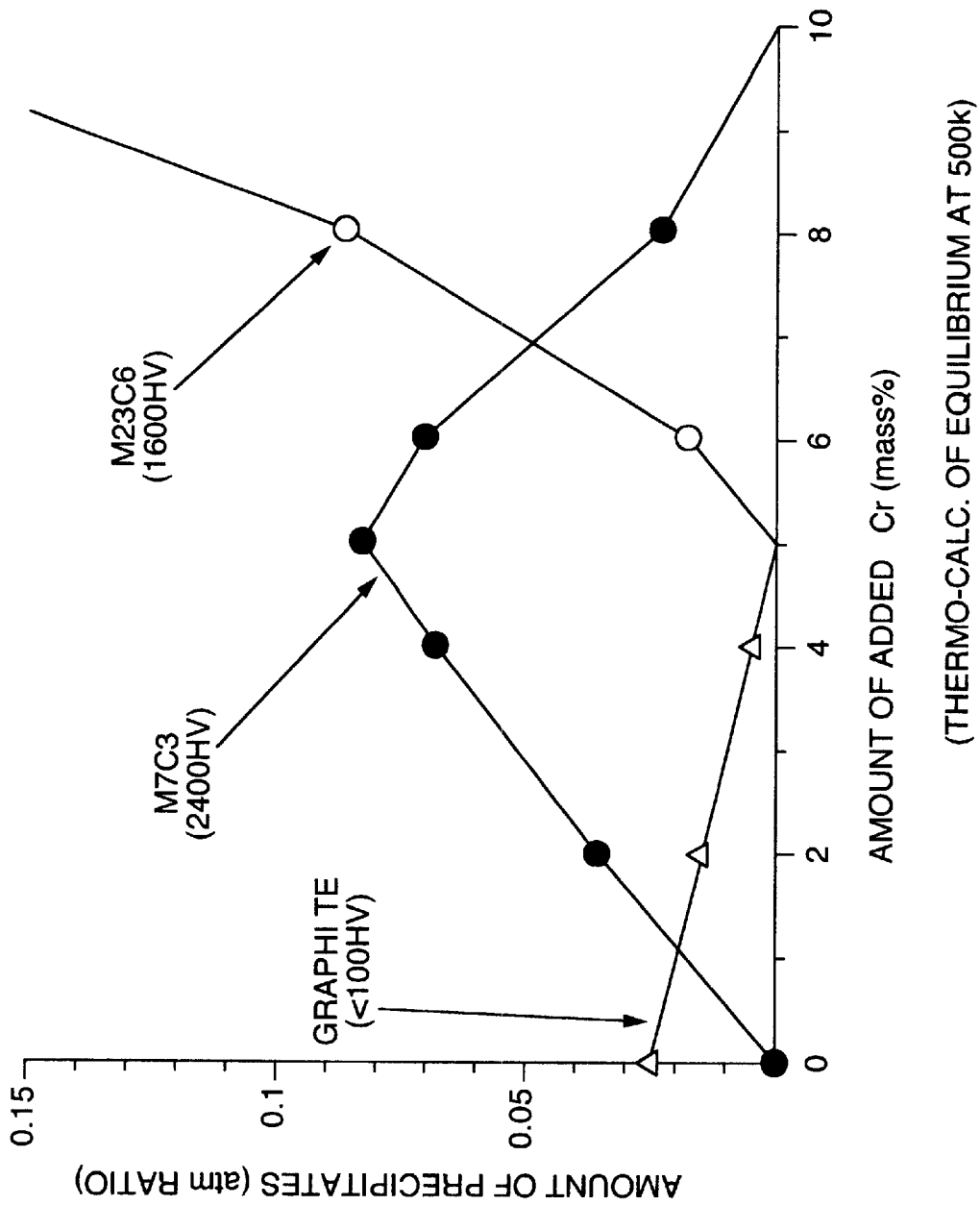
FIG. 1 is an explanatory view of a relation between the Cr content and the kinds and amount of carbides.

FIG. 1 is a graph used for estimating and designing the variation of the amount and the change of the kind of the precipitates by thermodynamic calculation when Cr is controlled in an alloy (Fe-0.55% C-0.2% Si-0.2% Mn steel) for use in the invention (the amounts of the precipitates are calculated and represented in atm ratio while the entire amount of the components of the alloy is set to 1). It is seen that the amount of the hardest $M_7C_3$ carbide (Vickers hardness: 2400 HV) is increased as the amount of Cr added in the alloy increases, however, the amount of the $M_7C_3$ carbide becomes maxium at the Cr amount of about 6%. Namely, it is seen that 3.0 to 6.0% Cr is a preferable composition when designing the maximizing of the wear resistance by minimum Cr addition amount. In a Cr content area lower than this preferred range, the effect thereof becomes small, but the sufficient hardenability can be maintained by the addition of at least 0.3%, and the productivity is enhanced.

However, in a case where the amount of Cr in a martensite matrix is increased by the excessive addition thereof, the oxides are apt to be preferentially formed on a seizure-occurring surface prior to the occurrence of sulfide affording the lubricating property, so that the anti-seizure property is deteriorated. This is because the precipitated, main carbide changes from $M_7C_3$ to $M_{23}C_6$ with the result that the amount of Cr to be absorbed in the carbide is lowered, and the amount of Cr in the martensite matrix greatly increases when Cr more than 5% is added. Furthermore, since in this case the hardness of the carbide mainly precipitated is also lowered, the wear resistance is deteriorated as described above. Thus, the upper limit of Cr is set to be 6.0%.

The above-described effect by the carbide is small in the low Cr content area as described above, but the area is preferred when the productivity and particularly cold workability are important. In this case, in order to sufficiently maintain the harden-ability, it is preferable to set the Cr content to be at least 0.3% and to set the upper limit to be 1.0%.

The most important element in the present invention is S. In piston rings made of conventional steel wire, the anti-seizure property is insufficient as described above, but the anti-seizure property can greatly be improved by adding an appropriate amount of S. Most of S is combined with Mn to form MnS, which acts on the engine oil and brings about the lubricating effect, so that the friction coefficient is lowered and the anti-seizure property is enhanced.

Seizure is a phenomenon in which frictional surface temperature is raised by the occurrence of frictional heat and in which atoms movement occurs between materials by thermal vibration with the result of the occurrence of adhesion, and the frictional face temperature is shown by monotonous increase function of friction energy (=friction coefficient×specific load×sliding speed). Therefore, when the friction coefficient decreases, the temperature does not easily rise, and the anti-seizure property is enhanced. At least 0.03% of S is necessary for obtaining the effect, but the excessive addition thereof results in the deterioration of the mechanical properties, rupture easily occurring in the drawing step for forming the steel wire of which the steel piston ring is formed, and the upper limit is therefore set to be 0.3%.

Moreover, the present inventors have also found out that, for the steel piston ring with as much as 0.3% of S added thereto, it is preferable to increase the ratio of forging performed in the manufacture process of the piston ring in respect of the mechanical properties. Specifically, by the large forging ratio, the mechanical properties of the piston ring are enhanced, and the large forging ratio becomes the means for suppressing the rupture/breaking in the bending process for the steel piston ring which is obtained by bending the steel wire in a predetermined curvature.

Incidentally, the forging ratio in this case is defined by the reduction of area occurring from an ingot to a piston ring product during the piston ring manufacture process. Namely, it is (ingot sectional area before forging)/(product sectional area after bending), that is, the ratio of the area of section of an ingot vertical to forging and drawing direction to the cross section of the final piston ring product. However, the variation of the reduction of area during the working from the steel wire to the piston ring product by bending can be ignored insofar as the attainment of the effect of the present invention is concerned, and (ingot sectional area before forging)/(steel wire sectional area before bending (after forging)) may be evaluated by the forging ratio. The higher forging ratio indicates that the forging is performed in a higher degree.

In a steel in a cast state (starting structure) containing sulfide such as MnS, many spherical or spindle-like sulfides are present in positions where the grain boundaries of a solidified cellular structure are triply overlapped, and the orientation thereof is random, but the orientation of the sulfides occurs with the increase of the forging ratio, and the mechanical properties are improved.

When the forging ratio is increased, the orientation of the sulfides in the steel wire is raised in the direction of the steel wire length, that is, the sulfide are extended along the peripheral stress mainly acting on the piston ring, and the mechanical properties are hardly deteriorated. This effect is remarkable particularly in the extended sulfides, that is, the sulfides each having the aspect ratio (maximum size/minimum size) of 3 or more. Therefore, in a case where the orientation of the sulfides with the aspect ratio of 3 or more is not raised toward the peripheral direction, the deterioration of the mechanical property occurs as described later.

Specifically, when the sulfide inclusions with an aspect ratio of 3 or more observed on a structure parallel to the outer peripheral surface of the piston ring is in such a distribution state as an intersecting angle (acute side angle) of two straight lines passing the maximum size of two sulfide inclusions are not more than 30 degrees, the piston ring satisfying the effect of the present invention can be attained, and the forging ratio for obtaining this sulfide distribution is preferably, for example, 500 or more.

Figure 2:
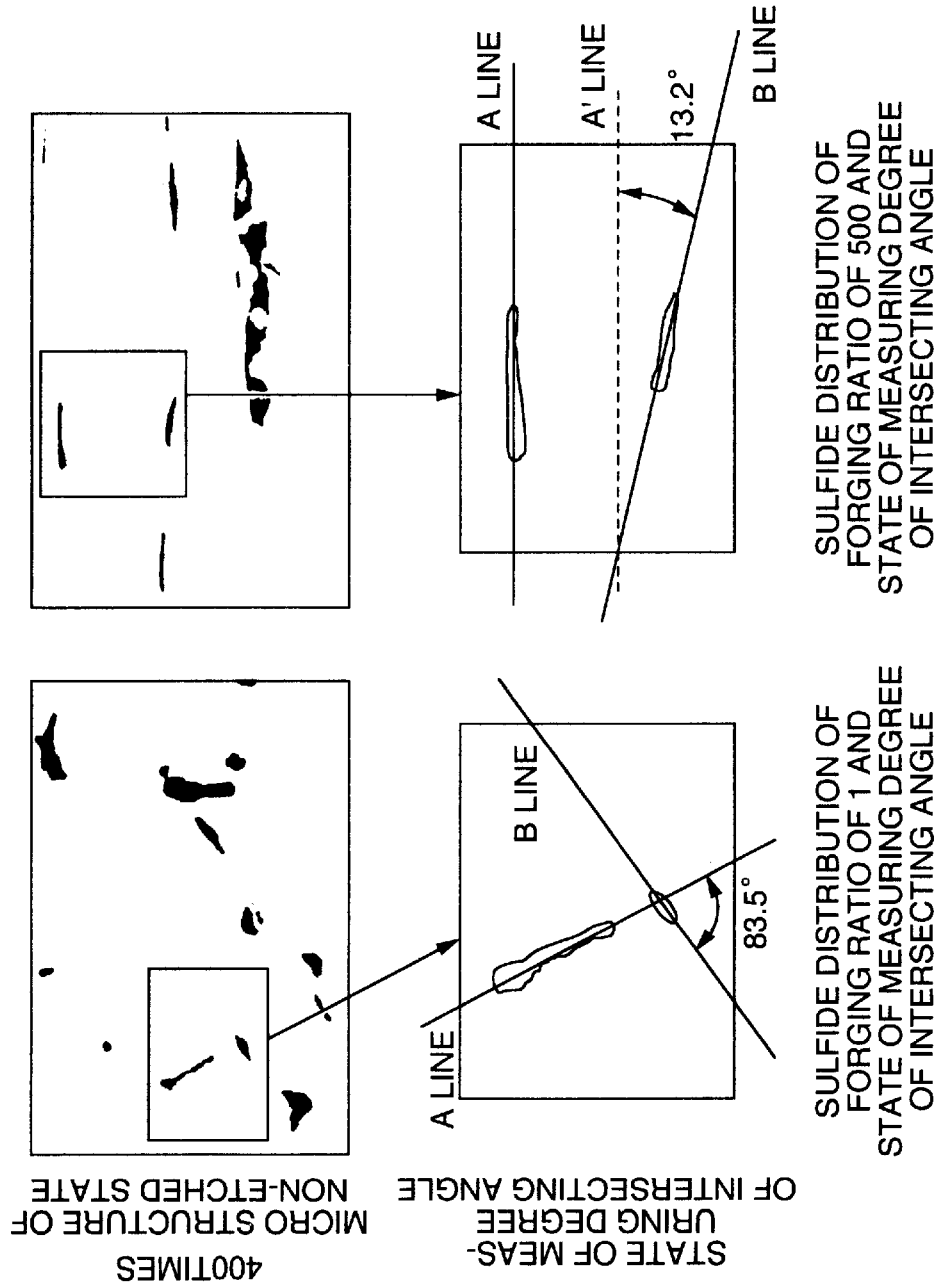
FIG. 2 shows sketches of a micro structure photograph showing the intersecting angle of sulfide inclusions and a schematic drawing thereof.

FIG. 2 are sketches of a micro structure observed by an optical microscope at a magnification of 400 times in a case where steels forged at the forging ratios of 1 (as cast state) and 500 are not etched, and schematic drawings showing the measurement of the intersecting angles of the sulfide inclusions. After choosing two arbitrary sulfide inclusions with the aspect ratio of 3 or more, the measuring of the acute angle made by the straight lines A, B passing the respective maximum size is repeated within observation fields of view. The measurement is performed over at least ten fields of view, and the maximum value of the angle is defined as the intersecting angle. If there is no intersection in the field of view (e.g., the forging ratio of 500 in FIG. 2), a line A' parallel to the line A may be adopted as an auxiliary line. Further, the wording "a piece of sulfide inclusion" is defined to be a sulfide inclusion appearing as one continuous inclusion when observed in the 400 times optical microscope observation, and the straight line passing the maximum size is used as the measurement line.

Figure 3:
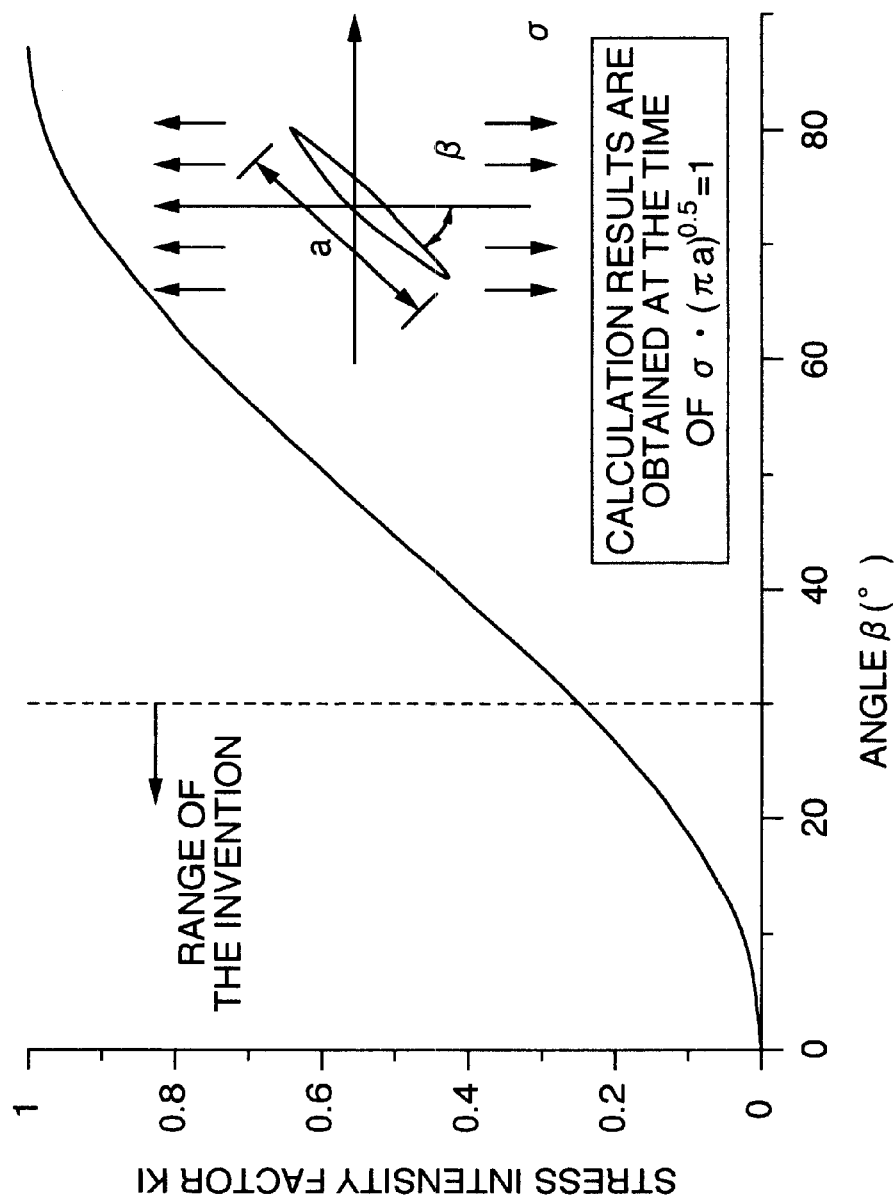
FIG. 3 is an explanatory view showing the influence of an angle made by a stress direction and a crack-developing direction, which is exerted on the stress intensity factor.

In FIG. 2, at the forging ratio of 1 the sulfide inclusions with an intersecting angle exceeding 30 degrees are present, but it is seen that an intersecting angle not more than 30 degrees is achieved in the case of the forging ratio of 500. Specifically, the numeral of 30 degrees is one designed in fructure mechanism. FIG. 3 shows the analytic calculation by G. R. Irwin (see Analysis of Stresses and Strains near the End of a Crack Transversing a Plate, Trans. ASME, Ser. E, J. Appl. Mech., Vol. 24, No. 3 (1957), pp. 361–364), and shows the change of a stress intensity factor when a certain angle is made between a stress direction and a crack developing direction, and the following equation is represented:

$$K_I = (1 - \cos^2 \beta) \sigma \sqrt{\pi a}$$

Here, $K_I$ is the stress intensity factor which becomes driving force for developing the crack, $\beta$ being the angle made between the stress direction and crack direction, $\sigma$ being the stress, $\pi$ being the ratio of the circumference of a circle to its diameter, and a is a crack length. The crack easily develops when the crack exists at right angles to the stress ($\beta = 90°$), the crack does not develop when the crack is present along the stress direction ($\beta = 0°$), and the crack easily develops (i.e., the stress intensity factor greatly rises) when the angle exceeds 30 degrees. In taking into consideration the respect that the inclusion is inferior in dynamic bonding and can be therefore regarded as the crack, it is found important to control the orientation variation regarding the inclusion distribution within the range of 30 degrees. Moreover, it is found to be important to provide the proper orientation of the extended inclusions.

S is a representative element to deteriorate the steel mechanical properties. If no countermeasure concerning the derioration of the strength is taken in a case of S-containing steel, it is difficult to establish the steel piston ring. For example, JP-A-7-258792 in which S addition, for example, as much as 1% is possible includes even a cylinder liner in which a sufficient forging ratio cannot be obtained and relates, in principle, to a cast steel. Actually, what is made it possible to form the steel piston ring with a relatively low cost is plastic working techniques such as drawing, rolling, and bending. Namely, in a case where the steel containing S as much as 1% is to be worked into the piston ring steel wire by use of these steps, the material strength required for the plastic working becomes insufficient, the rupture occurring in the drawing process, and the steel piston ring cannot be obtained.

As described above, according to the invention, the superior mechanical property of the piston ring is of course attained, and in addition the technique is established particularly in the sliding product remarkably high in forging ratio. Thus, the piston ring is limited to have such a S content as to be in a range of 0.03 to 0.3%.

Moreover, in order to further enhance the above-described effect of S, it is effective to add Ca and S together. Since Ca exists in MnS, it easily flows out to the seizure surface. Additionally, since Ca has an intensive reducing function, oxide is prevented from occurring on the seizure surface and the sulfide formation is facilitated, so that the lubricating properties are enhanced. However, since the excessive addition of Ca deteriorates the hot workability, the content of Ca is preferably 0.01% or less. In order to obtain the above-described effect, the content thereof is preferably 0.0001% or more, more preferably 0.0005% or more, and most preferably 0.002% or more. In addition, the addition of both of S and Ca is effective in enhancing not only the anti-seizure property but also the machinability and grindability.

Since Cu is densified and melted in grain boundaries and deteriorates the hot workability, the excessive content thereof results in the rupture of the steel material in the hot working process of the wire stock regarding the manufacture of the steel piston ring. Therefore, the content of Cu is set to be in a range of 0 to 3.0%, preferably 0 to 2.5%, more preferably not less than 0 but less than 0.5%. On the other hand, similarly to Ca, Cu is an element for suppressing the oxide occurrence on the newly generated steel surface formed just before seizure to thereby enhance the effect of S. The element Cu is known as the additive element of a weather-resistant steel, but this rust-suppressing action is not such an anticorrosion action of Cr as to form a passive oxide coating but such an action as the affinity of the steel for oxygen is reduced, so that the lubricating property of the S added material can sufficiently be obtained. The Cu content of 0.1% or more is preferred in order to obtain the effect.

The reasons why the area ratio of the nonmetallic inclusions occupying the structure is limited to be 2.0% or less as a preferable condition of the present invention are that no rupture occurs in the drawing process for working into the steel wire material, that the breaking is prevented during the forming of the wire material into a coil shape and that the manufacture with a high working efficiency becomes possible in the preferable range.

At least one of the elements V, Ti and Nb may be added for the purpose of fixing N (nitrogen) dissolved in the steel. Due to N in solid solution state, strain aging occurs in the steel at about 250° C., and the productivity is greatly reduced in the cold plastic working during the steel wire manufacture. Therefore, by adding a small amount of these elements and by fixing N as an MX type compound during annealing, the number of manufacture passes and the number of intermediate annealing can be reduced and the productivity can be enhanced. However, since the excessive addition thereof deteriorates the machinability, the total content of these added elements is set to be 0.5% or less. In order to obtain the effect, the content is preferably 0.1% or more.

The element Al raises the nitriding hardness together with Cr. Since the content of Cr cannot be raised in the invention, the nitriding hardness may be kept by Al. However, since the excessive addition of Al forms the coating of passive state and impedes the anti-seizure property, the upper limit is set to be 1.5%. Additionally, in order to obtain this effect, the Al content is preferably 0.01% or more.

Moreover, in the invention, the surface treatments such as nitriding, PVD, and Cr plating may be combined. Specifically, the piston ring for internal combustion engine may be subjected to the surface treatment while using the combination of one or two of the Cr plating, PVD, and nitriding treatments. The effect of the nitriding is added to the advantage of the invention, so that the anti-seizure property and wear resistance are enhanced. Moreover, even the PVD and Cr plating treatments which bring about no synergistic effect to the invention contribute to the invention in that Al adhesion is prevented from occurring on the non-treated surface in contact with the piston. Even in a case where the surface coating is worn out, the service life of the engine is prolonged by the S effect of the invention.

Regarding the sliding property between the piston ring and Al used as the main component of a piston material which sliding property is one of problems particularly in relation with the piston, Al inherently has very low wear resistance with respect to the steel, so that such conventional wear control as to utilize difference of wear resistance between different materials can not be used at all. In order to control the reaction of Al with Fe, the addition of S is essential for the invention in which the chemically active control is performed.

Further, the following elements may be contained within the following ranges in the steel to form the piston ring of the invention:

$P \leq 0.1\%$, $Mo \leq 1.0\%$, $W \leq 1.0\%$, $Ni \leq 2\%$, $Mg \leq 0.01\%$, $B \leq 0.01\%$, and $Zr \leq 0.1\%$ The effects of the invention will be described hereinafter by examples.

EXAMPLE 1

The ingots of sample Nos. 1 to 8, 10 and 12(sectional dimension of 220×220 mm) prepared in the composition shown in Table 1 were obtained by high-frequency induction melting in the atmosphere. Among the samples, the sample Nos. 1 to 7 satisfy the composition of the invention, while the sample No. 8 is an Si—Cr steel, No. 9 being JIS-SUJ2, No. 10 being a high S material, No. 12 being a high Cu material, and these comparative examples Nos. 8 to 10, and 12 do not fall in the composition range of the invention. Additionally, the sample No. 11 is cast iron JIS-FC250, and was prepared to form the cast iron piston ring by casting the molten metal into a mold.

TABLE 1

| Sam. No. | Chemical Composition (mass %) | | | | | | | | | |
|---|---|---|---|---|---|---|---|---|---|---|
| | C | Si | Mn | Cr | Al | S | V + Nb + Ti | Ca | Cu | Fe |
| 1 | 0.31 | 1.85 | 2.83 | 5.95 | <0.01 | 0.29 | — | 0.0002 | — | Bal. |
| 2 | 0.66 | 0.93 | 1.21 | 2.53 | 0.80 | 0.13 | — | 0.0010 | — | Bal. |
| 3 | 0.79 | 0.35 | 1.98 | 0.31 | 1.48 | 0.06 | — | 0.0030 | 2.96 | Bal. |
| 4 | 0.51 | 0.33 | 1.03 | 5.03 | <0.01 | 0.12 | — | 0.0060 | — | Bal. |
| 5 | 0.62 | 0.43 | 1.01 | 4.23 | <0.01 | 0.13 | 0.25 | 0.0098 | — | Bal. |
| 6 | 0.57 | 1.45 | 0.68 | 0.59 | <0.01 | 0.06 | — | <0.0001 | — | Bal. |
| 7 | 0.55 | 1.52 | 0.72 | 0.63 | 0.02 | 0.06 | — | 0.0058 | — | Bal. |
| 8 | 0.55 | 1.49 | 0.71 | 0.61 | <0.01 | <0.01 | — | 0.0003 | — | Bal. |
| 9 | 1.00 | 0.25 | 0.31 | 1.48 | <0.01 | <0.01 | — | <0.0001 | — | Bal. |
| 10 | 0.55 | 1.51 | 0.72 | 1.01 | <0.01 | 0.35 | — | 0.0002 | — | Bal. |
| 11 | 3.21 | 1.23 | 0.46 | 0.05 | <0.01 | 0.03 | — | <0.0001 | — | Bal. |
| 12 | 0.55 | 1.35 | 0.55 | 1.15 | <0.01 | 0.28 | — | <0.0001 | 3.44 | Bal. |

First, these ingots were subjected to hot and cold workings, and a wire-shaped stock with a sectional dimension of 9 mm×9 mm was obtained (forging ratio: about 598). Incidentally, the sample No. 12 was able to be cast, but the steel material was broken in the subsequent hot working step, so that no test piece was formed. Subsequently, after the annealing treatment, the predetermined hardening/tempering treatment was performed, and the hardness was adjusted to be about 520 HV. Then, regarding the wire-shaped stock with the adjusted hardness, the intersecting angle made between sulfide inclusions (aspect ratio≧3) existing in the -structure parallel to the longitudinal surface which became the outer peripheral surface of a piston ring was measured according to the above-described procedure. The sample No. 11 was formed by casting the molten alloy in Table 1 into the mold with a sectional dimension of 9 mm×9 mm.

Figure 4:
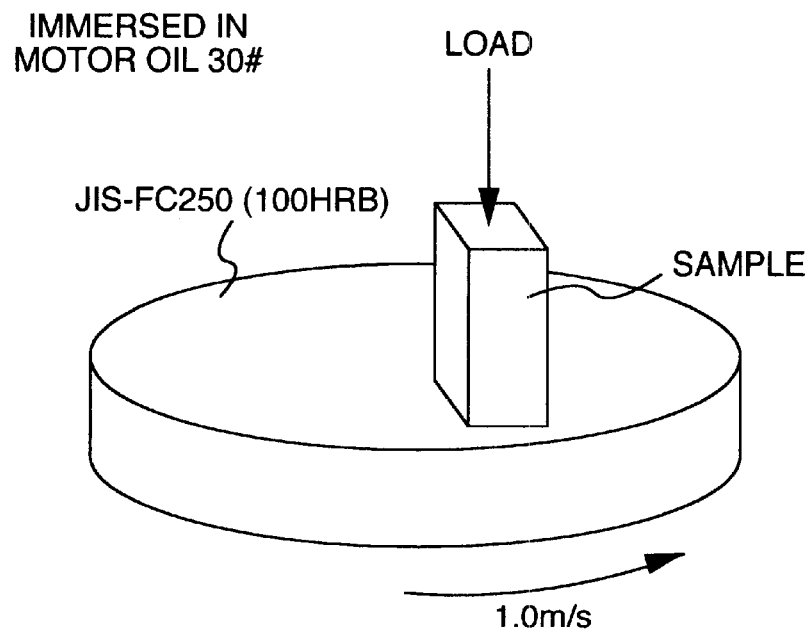
FIG. 4 is a schematic drawing showing an ultra-high pressure friction wear test method.

By using these samples, the anti-seizure property (scuff load) was evaluated to examined the basic performance of the piston ring. The test method was performed while using an ultra-high pressure friction wear tester shown in FIG. 4 on the conditions shown below, and the time when the load rapidly rose was deemed as seizure commencement. The evaluation result is shown in Table 2 together with the intersecting angle of the sulfide inclusions and test piece hardness.

Sliding surface shape: square of 5 mm×5 mm

Friction rate: 1 m/s

Friction surface pressure: initial pressure of 1 Mpa, increase by 1 MPa each three minutes Lubricating oil: motor oil #30 and Counterpart: JIS-FC250 (JIS gray cast iron)

TABLE 2

| Sample No. | Intersecting angle (°) | Hardness (HV) | Scuff load (MPa) | Remarks |
|---|---|---|---|---|
| 1 | 20.3 | 521 | >50 | Present invention |
| 2 | 21.6 | 517 | >50 | Present invention |
| 3 | 19.8 | 520 | >50 | Present invention |
| 4 | 22.4 | 510 | >50 | Present invention |
| 5 | 20.4 | 530 | >50 | Present invention |
| 6 | 15.6 | 503 | >50 | Present invention |
| 7 | 13.6 | 512 | >50 | Present invention |
| 8 | 21.2 | 512 | 24 | Comparative example |
| 9 | 20.9 | 522 | 31 | Comparative example |

TABLE 2-continued

| Sample No. | Intersecting angle (°) | Hardness (HV) | Scuff load (MPa) | Remarks |
|---|---|---|---|---|
| 10 | 22.0 | 521 | >50 | Comparative example |
| 11 | 83.7 | 198 | >50 | Comparative example |

Figure 5:
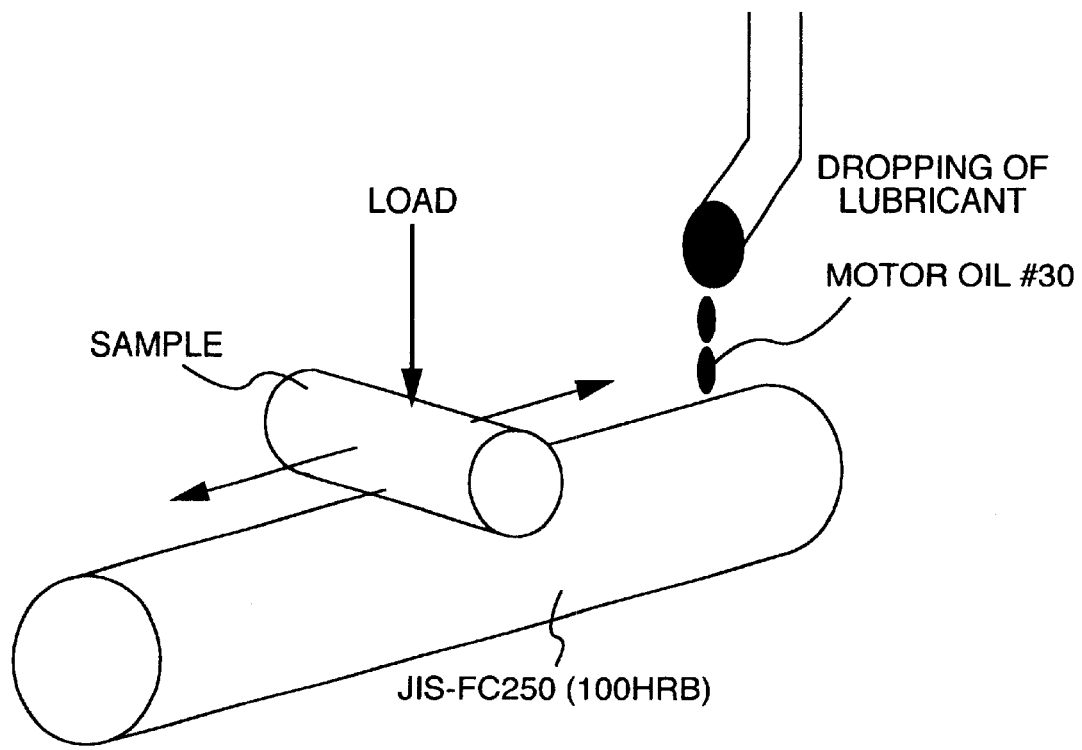
FIG. 5 is a schematic drawing showing a reciprocating motion wear test method.

Further, the wear resistance was evaluated by a reciprocating motion wear test. This comprises rubbing a test piece separately formed and having a diameter of 8 mm and length of 20 mm against the a counterpart (JIS-FC250) with a diameter of 20 mm by reciprocating motion and measuring the wear width, the schematic drawing of the test is shown in FIG. 5, and the other test conditions are shown below. The evaluation result is shown in Table 3.

| | |
|---|---|
| Pressing load: | 500 N |
| Sliding distance per one reciprocating motion: | 130 mm |
| Maximum sliding speed: | 0.5 m/s, and |
| Lubricating Oil: | Motor oil #30 (dripping) |

TABLE 3

| Sample No. | Wear Width (mm) | Remarks |
|---|---|---|
| 1 | 0.54 | Present invention |
| 2 | 0.65 | Present invention |
| 3 | 0.71 | Present invention |
| 4 | 0.50 | Present invention |
| 5 | 0.51 | Present invention |
| 6 | 0.55 | Present invention |
| 7 | 0.56 | Present invention |
| 8 | 0.72 | Comparative example |
| 9 | 0.56 | Comparative example |
| 10 | 0.58 | Comparative example |
| 11 | 1.53 | Comparative example |

It is apparent from Tables 2, 3 that the sample Nos. 1 to 7 satisfying the invention exhibit superior anti-seizure property and superior wear resistance. On the other hand, the sample No. 11 (cast iron FC250) has a large wear width and insufficient wear resistance. The sample No. 8 (Si—Cr steel), No. 9 (JIS-SUJ2) are satisfactory in wear resistance, but insufficient in anti-seizure property.

The sample state for use in evaluation in the first example can be assumed to be the same as that of the piston ring steel material before the bending to the ring shape. The reason why the anti-seizure property and wear resistance of the piston ring are not evaluated or measured in the bent state is that it is difficult to get samples each having a shape (size) necessary for obtaining an accurate measurement result insofar as the annular piston ring with a small sectional area is concerned. However, since the intersecting angle of the sulfide inclusions observed in the steel wire state before bending does not substantially vary even in the bent piston ring state and since the aspect ratio does not vary during the bending, either, the piston ring of the invention is sufficiently evaluated in the first example.

EXAMPLE 2

After each of the sample No. 1 and sample No. 10 having the composition of Table 1 was formed into a coil with a diameter of 5.5 mm by hot-rolling, the flat wire shape with a sectional dimension of 1.5 mm×3.1 mm was completed by drawing and cold-rolling. The sample No. 1 was able to be worked without any problem, but the sample No. 10 was ruptured during the drawing because of the deteriorated cold workability. When the area ratio of the nonmetallic inclusions occupying the structure was measured in the billet state before drawing by image analysis in the structure making right angles to the subsequent drawing/rolling direction, the sample No. 1 indicates 1.95%, the sample No. 10 indicating 2.52%, and the cause for the rupture resides in that the S content is high and that the area ratio of the nonmetallic inclusions exceeds 2.0%.

The amount of nonmetallic inclusions occupying the structure is preferably 2.0 area % or less even in the steel wire state before bending in order to prevent the wire stock from breaking during the bending, and the amount of nonmetallic inclusions is finally reflected in the observation result in the piston ring state.

EXAMPLE 3

The sample Nos. 1 to 9 in Table 1 were finished in the process described in the second example to form the flat wire shape with a sectional dimension of 1.5 mm×3.1 mm, the hardening being performed after keeping at 1000° C. for 30 minutes, and the tempering was performed to provide a hardness of about 510 HV. Thereafter, the cutting was performed ten times by a grindstone cutter at the number of revolutions $180000s^{-1}$ at a feeding speed of 1 mm/s, and the burr occurrence frequency was inspected. Table 4 shows the occurrence frequency.

TABLE 4

| Sample No. | Burr Occurrence Frequency | Remarks |
| --- | --- | --- |
| 1 | 0 | Present invention |
| 2 | 0 | Present invention |
| 3 | 0 | Present invention |
| 4 | 0 | Present invention |
| 5 | 0 | Present invention |
| 6 | 0 | Present invention |
| 7 | 0 | Present invention |
| 8 | 8 | Comparative example |
| 9 | 10 | Comparative example |

The burr occurrence is recognized in the sample Nos. 8, 9, but no burr occurrence is seen in the sample Nos. 1 to 7 to which the appropriate amount of S is added, and it is seen that the S addition of the invention is greatly effective for burr reduction. This enables a through automating line in the manufacture of the piston ring.

EXAMPLE 4

Figure 6A:
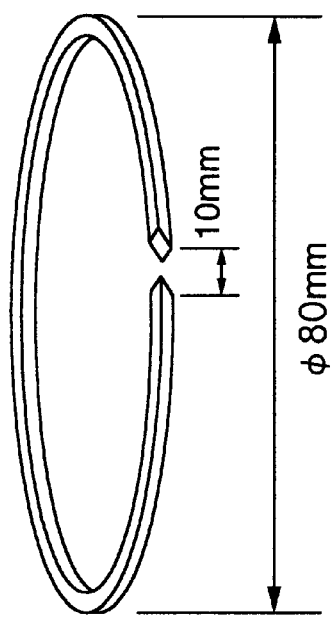
FIGS. 6A and 6B are a schematic drawing and a sectional view showing one example of a piston ring embodying the invention, respectively.
Figure 6B:
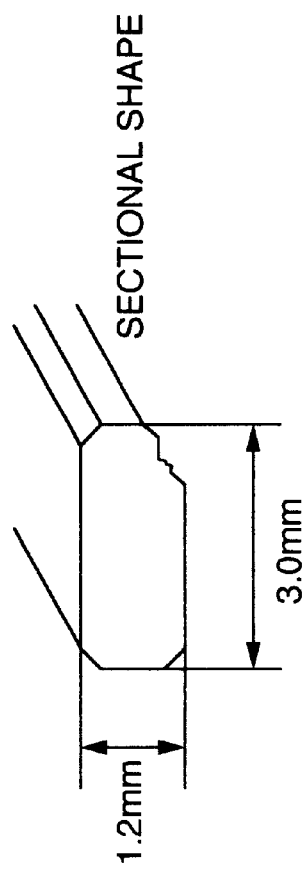

Separately formed ingots with the same composition as that of the sample Nos. 1 and 6 in Table 1 were used, and wire stock with a size of 3.0 mm×1.2 mm was formed in the hot and cold working process in which the forging ratios were varied between 1 and 10000 (see FIG. 6). Subsequently, the hardness was set to be 400 HV by hardening/tempering, and the intersecting angles of the sulfide inclusions (aspect ratio≦3) were measured on the structure parallel to the longitudinal surface of the wire stock which becomes the outer peripheral surface of the formed piston ring.

Subsequently, the three-point bending test with a span of 30 mm was performed on the wire stock with the adjusted hardness. The material was bent until a displacement of 10 mm was observed, the non-rupture material was shown by a mark "o", and the ruptured material was shown by another mark "x". This is used to evaluate the formability when the wire stock subjected to the hardening/tempering is formed into the piston ring with a predetermined curvature by roll bending. The results are shown in Tables 5 and 6.

TABLE 5

| Sample No. | Forging Ratio | Intersecting angle (°) | Rupture/ Non-rupture | Remarks |
| --- | --- | --- | --- | --- |
| 1-1 | 1 | 86 | x | Comparative example |
| 1-2 | 10 | 43 | x | Comparative example |
| 1-3 | 500 | 28 | o | Present invention |
| 1-4 | 2000 | 11 | o | Present invention |
| 1-5 | 10000 | 5 | o | Present invention |

TABLE 6

| Sample No. | Forging Ratio | Intersecting angle (°) | Rupture/ Non-rupture | Remarks |
| --- | --- | --- | --- | --- |
| 6-1 | 1 | 87 | x | Comparative example |
| 6-2 | 10 | 52 | x | Comparative example |
| 6-3 | 500 | 21 | o | Present invention |
| 6-4 | 2000 | 13 | o | Present invention |
| 6-5 | 10000 | 4 | o | Present invention |

When the forging ratio was low and when the intersecting angle of sulfide inclusions exceeded 30 degrees, the mechanical properties were deteriorated, and the rupture occurred during the bending of the wire stock to the ring shape. Subsequently, when the wire stock superior in bending workability was bent to form the piston ring shaped as shown in FIG. 6, the above-described intersecting angle of sulfide inclusions observed on the structure parallel to the outer peripheral surface did not substantially vary from that of the wire stock.

The intersecting angle of the sulfide inclusions observed in the wire stock is reflected in the bent piston ring state as described above. Further, regarding the fear of fatigue rupture heritherto apt to occur due to insufficient mechanical properties when the piston ring with the small sectional area is mounted on the engine, in a case where the intersecting angle of the sulfide inclusions is 30 degrees or less as in the invention, the sufficient mechanical properties can be maintained.

According to the invention, there can be provided the piston ring having the self-lubricating property and is therefore superior in the anti-seizure property without any surface treatment, so that the attacking property to the cylinder liner and piston is reduced. Further, since the workability such as machinability in the manufacture process is also enhanced and since the manufacture cost and lead time can be reduced, the piston ring is superior both in performance and manufacture. Since the internal combustion engine with this piston ring mounted thereon can be expected to contribute to the enhancement of the environmental performance and durability, a remarkably industrial advantage is achieved.

What is claimed is:

1. An elongate piston ring material with self-lubrication adapted to be suitable for producing a piston ring for an internal combustion engine, said piston ring material comprising a steel consisting essentially, by mass, of not less than 0.3% but less than 0.8% carbon, 0.1 to 3.0% silicon, 0.1 to 3.0% manganese, 0.03 to 0.3% sulfur, 0.3 to 6.0% chromium, 0 to 3.0% copper, and the balance iron, said piston ring material including sulfide inclusions each having aspect ratio, that is, ratio of maximum size to minimum size, not less than 3 when observed in longitudinal structure of said material, said sulfide inclusions in said longitudinal structure being oriented so that an intersecting angle made between an imaginary, straight line passing said maximum size of any one of said sulfide inclusions and another imaginary, straight line passing said maximum size of another of said sulfide inclusions is not more than 30 degrees.

2. A piston ring material as set forth in claim 1, wherein an area ratio of non-metallic inclusions occupying in the structure is not more than 2%.

3. A piston ring material with self-lubrication adapted to be suitable for producing a piston ring for an internal combustion engine, said piston ring material comprising a steel consisting essentially, by mass, of not less than 0.3% but less than 0.8% carbon, 0.1 to 3.0% silicon, 0.1 to 3.0% manganese, 0.03 to 0.3% sulfur, 0.3 to 6.0% chromium, 0 to 3.0% copper, and the balance iron, said piston ring material including sulfide inclusions each having aspect ratio, that is, ratio of maximum size to minimum size, not less than 3 when observed in a structure present in a face parallel to an outer periphery of the piston ring formed of the piston ring material, said sulfide inclusions in said structure being provided with such a distribution state as an intersecting angle made between an imaginary, straight line passing said maximum size of any one of said sulfide inclusions and another imaginary, straight line passing said maximum size of another of said sulfide inclusions is not more than 30 degrees.

4. A piston ring material as set forth in claim 3, wherein an area ratio of non-metallic inclusions occupying in the structure is not more than 2%.

5. A piston ring material as set forth in claim 1 or 3, wherein said steel further contains calcium not more than 0.01 mass %.

6. A piston ring material as set forth in claim 1 or 3, wherein said steel further contains 3.0 to 6.0 mass % chromium.

7. A piston ring material as set forth in claim 1 or 3, wherein said steel further contains 0.3 to 1.0 mass % chromium.

8. A piston ring material as set forth in claim 1 or 3, wherein said steel further contains at least one not more than 0.5 mass % in total selected from the group consisting of vanadium, niobium, and titanium.

9. A piston ring material as set forth in claim 1 or 3, wherein said steel further contains aluminum not more than 1.5 mass %.

10. A piston ring with self-lubrication for an internal combustion engine, said piston ring comprising a steel consisting essentially, by mass, of not less than 0.3% but less than 0.8% carbon, 0.1 to 3.0% silicon, 0.1 to 3.0% manganese, 0.03 to 0.3% sulfur, 0.3 to 6.0% chromium, 0 to 3.0% copper, and the balance iron, said piston ring including sulfide inclusions each having aspect ratio, that is, ratio of maximum size to minimum size, not less than 3 when observed in a structure present in a face coaxial with an outer periphery of the piston ring, said inclusions in said structure being provided with such a distribution state as an intersecting angle made between an imaginary, straight line passing said maximum size of any one of said sulfide inclusions and another imaginary, straight line passing said maximum size of another of said sulfide inclusions is not more than 30 degrees.

11. A piston ring as set forth in claim 10, wherein an area ratio of non-metallic inclusions occupying in the structure is not more than 2%.

12. A piston ring as set forth in claim 10, wherein said steel further contains calcium not more than 0.01 mass %.

13. A piston ring as set forth in claim 10, wherein said steel further contains 3.0 to 6.0 mass % chromium.

14. A piston ring as set forth in claim 10, wherein said steel further contains 0.3 to 1.0 mass % chromium.

15. A piston ring as set forth in claim 10, wherein said steel further contains at least one not more than 0.5 mass % in total selected from the group consisting of vanadium, niobium, and titanium.

16. A piston ring as set forth in claim 10, wherein said steel further contains aluminum not more than 1.5 mass %.

17. A piston ring as set forth in claim 1, wherein the copper content is not less than 0 but less than 0.5%.

18. A piston ring as set forth in claim 3, wherein the copper content is not less than 0 but less than 0.5%.

19. A piston ring as set forth in claim 10, wherein the copper content is not less than 0 but less than 0.5%.

* * * * *